Aug. 21, 1951  D. G. ROOS  2,564,792
MEANS FOR PROTECTING BEARINGS AND SHAFT SEALS
Filed Dec. 7, 1946  2 Sheets-Sheet 1
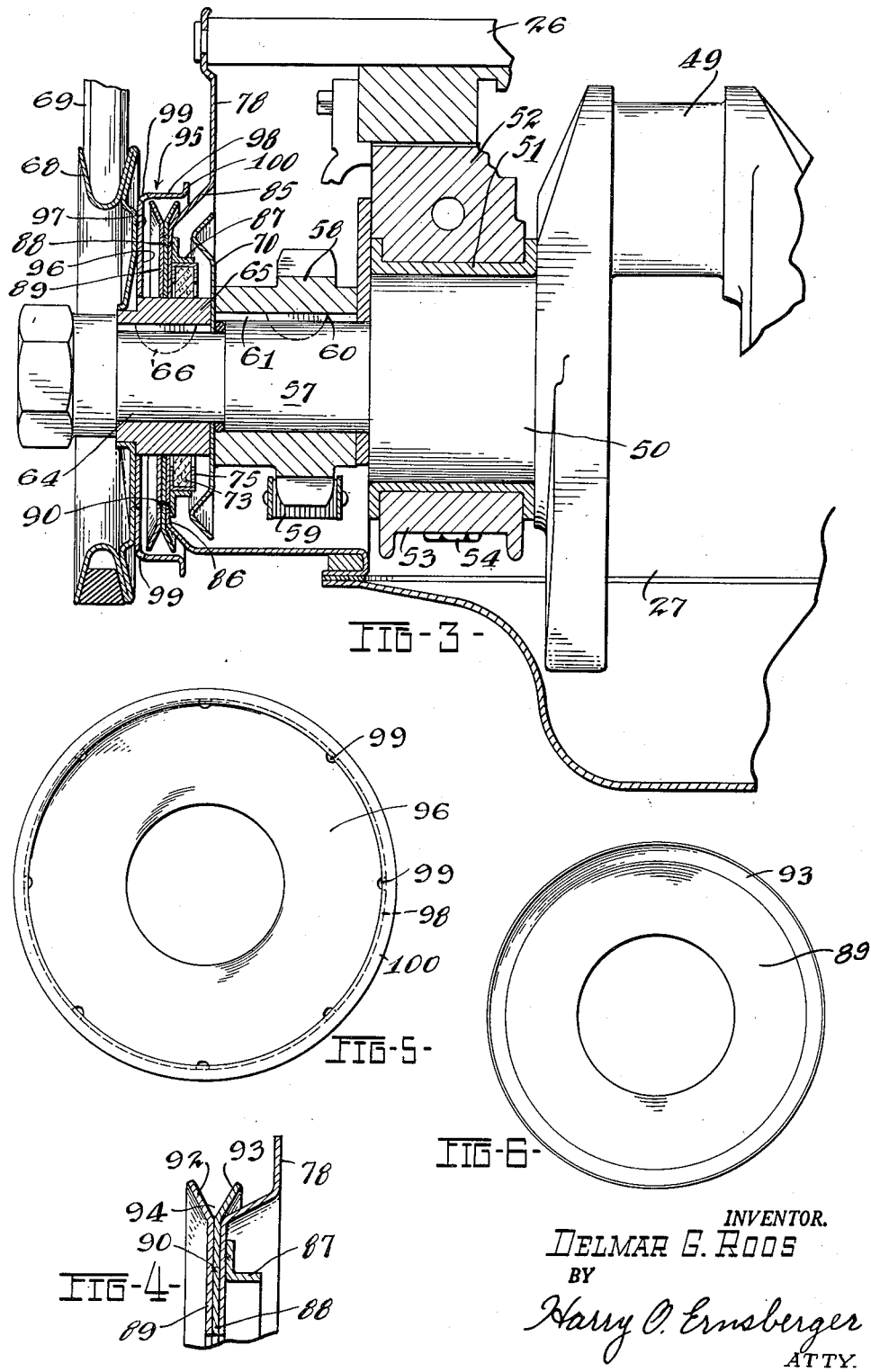
INVENTOR.
DELMAR G. ROOS
BY
Harry O. Ernsberger
ATTY.

Aug. 21, 1951  D. G. ROOS  2,564,792
MEANS FOR PROTECTING BEARINGS AND SHAFT SEALS
Filed Dec. 7, 1946  2 Sheets-Sheet 2
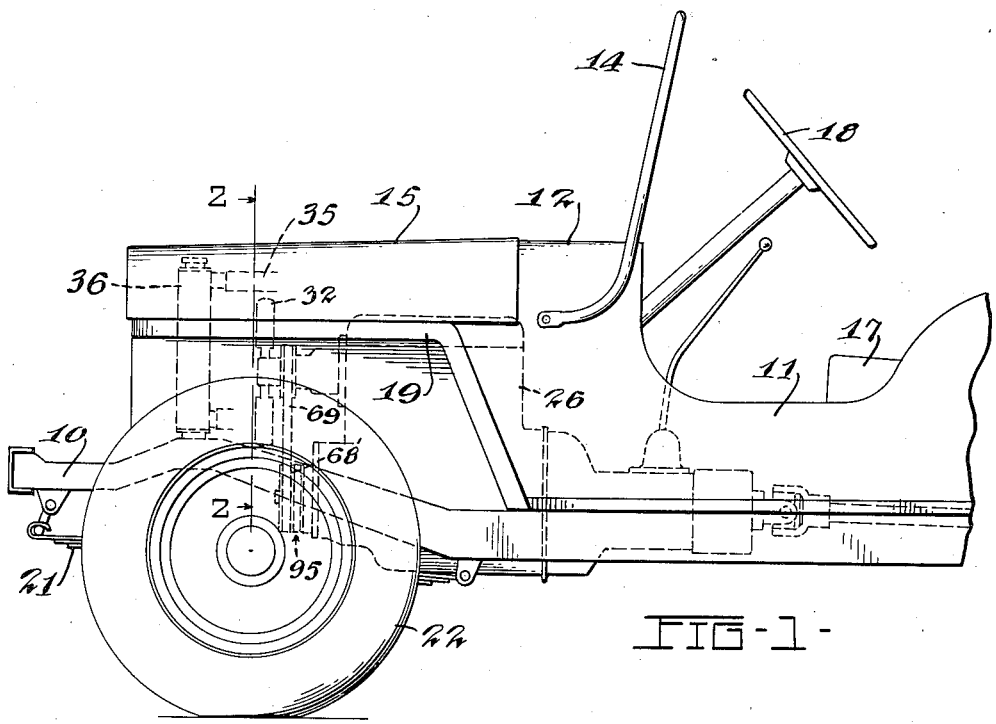
FIG-1-
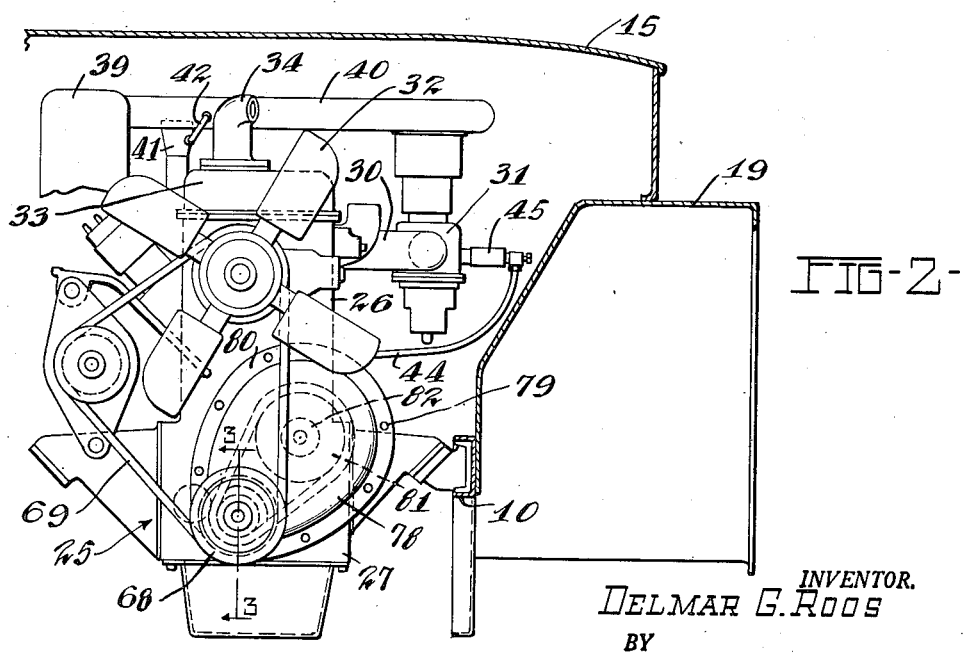
FIG-2-
INVENTOR.
DELMAR G. ROOS
BY
Harry O. Ernsberger
ATTY.

Patented Aug. 21, 1951

2,564,792

UNITED STATES PATENT OFFICE 2,564,792

MEANS FOR PROTECTING BEARINGS AND SHAFT SEALS

Delmar Gerle Roos, Toledo, Ohio, assignor to Willys-Overland Motors, Inc., Toledo, Ohio, a corporation of Delaware Application December 7, 1946, Serial No. 714,785

3 Claims. (Cl. 286—5)

This invention relates to means for preventing the ingress of foreign matter into bearings and more especially to means for preventing foreign matter from entering the crankcase of an internal combustion engine.

In the practical installation of internal combustion engines as power units for self-propelled vehicles, it has become desirable to provide a reduced pressure in the engine crankcase and valve chamber for the purpose among others of creating a flow of air through the crankcase for ventilation purposes in removing fumes, oil vapors and the like. In many installations this reduced pressure or partial vacuum provided in an engine crankcase and valve chamber is created by the utilization of subatmospheric pressure existent in the intake manifold of the engine when the latter is in operation, the suction created in the manifold being utilized to draw clean air through the crankcase and valve chamber.

The efficiency of a crankcase and valve chamber ventilating system of this nature necessitates the maintenance of effective sealing means at the zone where a portion of the engine crankshaft projects exteriorly of the crankcase. It has been found that in many instances where a vehicle is driven through water containing mud, silt or other foreign matter, that the forward exterior portion of the engine becomes covered with the contaminated water which flows or gravitates to a point adjacent the crankshaft sealing means disposed at the forward end of the engine. It has been found that a crankshaft sealing means under some conditions of operation may admit the passage into the crankcase of a very minute amount of air which does not impair normal engine operation. However, when foreign matter entrained in water is deposited upon the engine block adjacent the sealing means, it has been found that under the influence of the differential or reduced pressure existing in the crankcase, water and foreign matter is sucked or forced by such pressure difference into the sealing means. Even the presence of a slight amount of sand, silt or granular matter will cause the seal to become worn and in a comparatively short time failure of the seal occurs so that larger quantities of foreign matter may then enter the crankcase chamber and contaminate the lubricant contained therein.

It is an object of this invention to protect the crankshaft sealing means and prevent the ingress of foreign matter into the engine crankcase and valve chambers.

Another object of the invention is to provide a baffle arrangement whereby water entrained with foreign matter is diverted away from the zone of the crankshaft sealing means whereby the life of the sealing means is greatly prolonged and damage to the engine from this cause averted.

Another object of the invention resides in the provision of means associated with a revoluble member disposed exteriorly of the engine upon the crankshaft extension whereby water and foreign matter are diverted from the zone of the crankshaft sealing means under the influence of centrifugal forces of the revoluble member.

A further object of the invention resides in the provision of a relatively stationary shield or baffle means cooperating with a revoluble member for diverting foreign matter away from the crankshaft.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is an elevational view of the forward portion of a vehicle having an internal combustion engine equipped with the arrangement of my invention;

Figure 2 is a vertical sectional view taken substantially on the line 2—2 of Figure 1;

Figure 3 is an enlarged detail sectional view taken substantially on the line 3—3 of Figure 2;

Figure 4 is a fragmentary detail sectional view illustrating the stationary baffle construction of the seal protector;

Figure 5 is an elevational view of the revoluble element, and

Figure 6 is an elevational view of one of the baffle plates.

While I have illustrated a form of my invention as embodied in an internal combustion engine of a type utilized as a prime mover for a vehicle, it is to be understood that I contemplate the utilization of my invention in any construction wherein it is desirable to divert foreign matter from areas or zones adjacent rotating elements.

Referring to the drawings in detail, and first with respect to Figures 1 and 2, there is illustrated an automotive vehicle which is inclusive of a frame 10 upon which is mounted a body 11 having a cowl structure 12, a windshield 14 and an engine enclosure or bonnet 15. The vehicle is provided with an operator's seat 17, steering wheel 16, the forward portion of the vehicle being provided with fenders 19. Secured to the vehicle frame 10 are leaf springs 21 to which are secured axles or other members upon which are mounted road wheels 22.

Disposed beneath the enclosure or bonnet 15 and supported upon frame 10 is an internal combustion engine 25. The engine construction is inclusive of a cylinder block 26, a crankcase 27, manifold 30, carburetor 31 and a cooling fan 32. The cylinder head 33 of the engine is provided with a water receiving manifold 34 which communicates by means of the tube 35 with a cooling radiator 36 mounted upon the frame 10 as shown in Figure 1. As illustrated the engine 25 is provided with an air cleaner 39 from which filtered air is conveyed to the carburetor 31 through a tube 40. The engine illustrated in the drawings is provided with means for ventilating the engine crankcase and valve chamber. In this connection the engine is provided with an oil filler tube 41 which is connected with the air passage or tube 40 by means of a bypass 42 whereby air may flow from the air cleaner through the bypass 42 and oil filler tube 41 into the crankcase 27. A tube 44 is connected from the crankcase 27 to the intake manifold 30 and through valve means contained in a fitting 45, the subatmospheric or reduced pressure existing in the intake manifold 31 causes a flow of air through the tube 44 and fitting 45 to create a movement or circulation of air through the crankcase.

This ventilating arrangement, during engine operation, sets up a subatmospheric pressure within the crankcase. Hence, to secure proper ventilation of the crankcase by the circulation of clean air, the stuffing glands or sealing means for the crankshaft must be maintained in an effective and efficient condition to prevent the ingress of foreign matter into the crankcase. I have found that when the sealing means is defective or becomes worn that leakage past the seal develops and such condition not only permits foreign matter to enter the crankcase, but reduces the effective and proper circulation of clean air through the crankcase.

Heretofore, it has been found that the crankshaft seal or sealing means may become worn or damaged by the mud, silt or foreign matter entrained in water which may be splashed upon the vehicle engine during operation of the vehicle in inclement weather. The present invention embraces a means for preventing foreign matter from reaching the sealing zone of the shaft. With particular reference to Figure 3, the vehicle engine crankcase 27 encloses a crankshaft 49 which is connected to pistons (not shown) disposed in the cylinder block. The crankshaft at its forward end is provided with a cylindrical portion 50 which is journaled in a suitable bearing 51. The bearing 51 is of suitable anti-friction material which in turn is supported in a saddle 52 having a bearing cap 53, the latter being held in position by means of securing bolts 54. The crankshaft is provided forwardly of the journal portion 50 with a cylindrical tenon or portion 57 upon which is mounted a sprocket gear 58 engaged by suitable chain 59 for operating the engine valve-actuating camshaft 82. The gear 58 is secured to the crankshaft by means of a suitable key 60 which engages in a circular recess formed in the tenon 57 and in a longitudinal key way 61 formed in the gear 58. Also integrally formed on the crankshaft and forwardly of portion 57 is a second tenon 64 extending exteriorly of the engine and upon which is supported a hub 65 arranged to rotate with the shaft through the medium of a key 66. Secured to the hub 65 is a pulley 68 which is engaged by belt 69 for driving the cooling fan 32. Disposed between the gear 58 and the hub 65 is a plate or disc 70 which functions, during rotation of the crankshaft to prevent an excess amount of lubricant accumulating adjacent the hub 65.

A shaft sealing means or stuffing gland embodying a quantity of suitable sealing material 73 engages the periphery of the hub 65 providing a seal to prevent escape of lubricant from the crankcase and prevent the ingress of foreign matter into the crankcase. The sealing material 73 is mounted in a circular retainer 75 preferably of channel shape in cross section as shown in Figure 3. The front of the crankcase or timing chain compartment is enclosed by means of a coverplate or closure 78 which is secured to the motor or engine block 26 by means of suitable bolts or screws 79 which pass through a flange 80 in the cover 78. The timing chain is connected to a second sprocket 81 secured to the end of the camshaft 82 for operating the valve mechanism (not shown) of the engine. As shown in Figures 2 and 3 the coverplate is configurated to enclose the timing chain 59 and the sprockets 58 and 81. The cover 78 is formed with an outwardly extending or bulging portion 85 which accommodates the sealing means and terminates in a flange portion 86 to which is welded or otherwise secured an annular member 87, the latter forming a carrier or support for the member 75 enclosing and surrounding the sealing material 73.

While the sealing material 73 under normal conditions functions to prevent escape of lubricant along the hub 65 and to prevent ingress of foreign matter, the seal is sometimes subjected to splashes of water in which silt or other foreign matter is entrained. This arises by reason of the rapid forward movement of a vehicle in use, which encountering pools of water containing foreign matter splashes the same upon the forward portion of the engine block 26 and the cover or closure 78. It has been found in practice that the sand, silt, mud or foreign material comes in contact with the periphery of the hub 63 and works its way between the sealing material 73 and the exterior cylindrical surface of the hub 65. This action in a comparatively short period of time tends to wear and render ineffective the sealing material 73 until the crankcase is no longer effectively sealed by the sealing means 73. The foreign matter is virtually sucked or driven into the engine crankcase under the influence of the atmospheric pressure being higher than the existing pressure on the interior of the crankcase and valve chamber, this differential in pressure existing by reason of the use of subatmospheric pressure to normally cause the circulation of clean air through the crankcase and valve chamber to ventilate said chamber by conveying gases into the intake manifold in the manner herein previously described.

To eliminate or reduce this hazard and difficulty, I have provided means disposed adjacent the sealing means to divert or prevent water laden with sand, silt, mud and the like from reaching the zone of the sealing material 73. To this end I have provided baffle means in the form of a pair of baffles or disk-like members 88 and 89 which are welded or otherwise secured together by several spot welds as indicated at 90. The innermost disk 88 is spot welded to the flange 86 formed on the bulge 85 of the cover plate 78. As particularly shown in Figures 3 and 4, the peripheral portions are angularly disposed to the normal planes of the disks and such portions are angularly divergent as shown at 92 and 93 forming together an annular trough 94 of V-shape in cross section.

The pulley 68 carried at the forward portion of the hub 65 is secured to a circular element 95, the latter being formed with a disk-like portion 96 which is spot welded as at 97 to the pulley 68. The member 95 is formed with an axially extending peripheral flange 98 which surrounds and is slightly spaced from the edges of the divergent portions 92 and 93 of the disks 88 and 89. The juncture of the flange 98 with the disk-like portion 96 is provided with a plurality of spaced vents or openings 99 as particularly shown in Figures 3 and 5.

In the operation of the device during engine operation, the pulley 68 and element 95, being secured together, are rotated by the crankshaft 49. In the event that silt laden or muddy water is splashed upon the cover plate 78 or other forward portions of the engine construction, such foreign matter moves downwardly on the exterior surface of the cover 78 towards the zone of the sealing means. The water and foreign matter come into contact with the peripheral angularly divergent portions of the disks 88 and 89 which by their particular configuration and juxtaposition with respect to the element 95 momentarily direct the muddy water toward the rotating element 95. Furthermore, due to the fact that the peripheral edges of the angularly divergent portions of disks 88 and 89 are very closely disposed with respect to the inner surface of flange 98 of rotating element 95, comparatively minute annular spaces are thereby provided for the passage of water and foreign matter between the edges of disks 88 and 89 and flange 98. This arrangement thus causes water and foreign matter passing through such annular spaces to be directly subjected to and influenced by the rotation of element 95. Under the centrifugal action obtaining by reason of the rotation of element 95 the mud, water, silt, et cetera is thrown outwardly through vent openings 99 or around the portion 100 of element 95 and away from the zone of the sealing means 73. Some foreign matter entrained in the water may flow downwardly in the V formation 94 formed by the baffle plates 88 and 89. As such foreign matter moves to the lower portions of the disks, the foreign matter and water will drop by gravity into engagement with the element 95 and be thrown outwardly through the vent openings 99 or around portion 100. By this means of stationary baffle plates having their peripheries terminating in juxtaposition with a rotating element, foreign matter is directed away from the sealing means 73 by centrifugal action of element 95. It has been found in actual application of this construction that foreign matter is practically entirely excluded from the zone of the sealing means 73 and that the life of the seal is greatly prolonged. Thus by maintaining an effective seal, the crankcase ventilation system operates effectively, and silt, grit or mud is prevented from entering the crankcase chamber where it would otherwise cause excessive wear and failure of the bearings and other elements of the engine construction.

It is apparent that, within the scope of the invention, modifications and different arrangements may be made other than is herein disclosed, and the present disclosure is illustrative merely, the invention comprehending all variations thereof.

What I claim is:

1. In combination, a revoluble member; a stationary wall adjacent to said revoluble member; sealing means associated with the wall for effecting a seal adjacent the revoluble member; baffle means including a pair of circular disks arranged adjacent said sealing means and secured to said wall; said baffle means having their peripheral portions arranged in angularly divergent relationship; a revoluble element carried by the revoluble member and formed with a flange portion disposed adjacent to and overlapping the divergent peripheral portions of said baffle means; said element being configurated in a manner whereby rotation thereof cooperates with said baffle means to divert foreign matter away from the zone of said sealing means; said revoluble element having a plurality of peripherally spaced openings for the passage of foreign matter therethrough.

2. In combination, a revoluble member; a relatively stationary wall adjacent said revoluble member; sealing means associated with the wall for effecting a seal adjacent the revoluble member; baffle means arranged adjacent said sealing means and secured to said wall; said baffle means having peripheral angularly divergent portions; a revoluble element carried by the revoluble member and formed with a flange portion disposed adjacent to and overlapping the divergent peripheral portions of said baffle means; said element being configurated in a manner whereby rotation thereof cooperates with said baffle means to divert foreign matter away from the zone of said sealing means, said revoluble element being formed with peripherally spaced openings for the passage of foreign matter therethrough.

3. In combination, a revoluble member; a stationary wall adjacent said revoluble member; sealing means associated with the wall for effecting a seal adjacent the revoluble member; baffle means including a disk arranged adjacent said sealing means and secured to said wall; said baffle disk having peripheral angularly divergent portions; a revoluble element carried by the revoluble member and formed with a flange portion disposed adjacent to and overlapping the angularly divergent peripheral portions of the baffle means; said element being configurated in a manner whereby rotation thereof cooperates with said baffle means to divert foreign matter away from the zone of said sealing means; said revoluble element having a plurality of spaced openings for the passage of foreign matter therethrough.

DELMAR GERLE ROOS.

REFERENCES CITED

The following references are of record in the file of this patent:

UNITED STATES PATENTS

| Number | Name | Date |
|---|---|---|
| 1,395,480 | Butchart | Nov. 1, 1921 |
| 1,922,076 | Brittain | Aug. 15, 1933 |
| 1,954,090 | Moorhouse | Apr. 10, 1934 |

OTHER REFERENCES

Dykes Automobile and Gasoline Engine Encyclopedia, page 1129, 1941. (Copy in Div. 28.)